US012182281B2

(12) United States Patent
Ward et al.

(10) Patent No.: US 12,182,281 B2
(45) Date of Patent: Dec. 31, 2024

(54) LOGIC CIRCUITRY PACKAGES FOR REPLACEABLE PRINT APPARATUS COMPONENTS

(71) Applicant: HEWLETT-PACKARD DEVELOPMENT COMPANY, L.P., Spring, TX (US)

(72) Inventors: Jefferson P. Ward, Vancouver, WA (US); Jesse Otto Sutherland, III, Vancouver, WA (US); Peter Le Chevallier, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 282 days.

(21) Appl. No.: 17/730,067

(22) Filed: Apr. 26, 2022

(65) Prior Publication Data

US 2023/0020478 A1    Jan. 19, 2023

Related U.S. Application Data

(63) Continuation of application No. PCT/US2021/042096, filed on Jul. 16, 2021.

(51) Int. Cl.
| | |
|---|---|
| *G06F 21/44* | (2013.01) |
| *G03G 15/00* | (2006.01) |
| *G03G 15/08* | (2006.01) |
| *G03G 21/18* | (2006.01) |
| *G06F 21/60* | (2013.01) |

(52) U.S. Cl.
CPC ....... *G06F 21/608* (2013.01); *G03G 15/0863* (2013.01); *G03G 21/1882* (2013.01); *G03G 21/1892* (2013.01); *G06F 21/44* (2013.01)

(58) Field of Classification Search
CPC .......... G03G 21/1882; G03G 21/1892; G03G 15/0863; G06F 21/44; G06F 21/608; G06F 21/72
See application file for complete search history.

(56) References Cited

U.S. PATENT DOCUMENTS 6,305,313 B1 * 10/2001 Cunkelman ............ G01K 11/06
374/E11.006
9,893,893 B2    2/2018 Ness et al.
(Continued)

FOREIGN PATENT DOCUMENTS

| | | |
|---|---|---|
| CN | 111890811 A | 11/2020 |
| EP | 2520044 A1 | 11/2012 |

(Continued)

*Primary Examiner* — Mohammad A Siddiqi
(74) *Attorney, Agent, or Firm* — Foley & Lardner LLP

(57) ABSTRACT

A logic circuitry package for a replaceable print apparatus component includes a logic circuit and an interface to communicate with a print apparatus logic circuit. The logic circuit is configured to include a plurality of personalities, each personality of the plurality of personalities including an ID and a cryptographic key. The logic circuit is further configured to start a cryptographic session with the print apparatus logic circuit using a selected personality of the plurality of personalities, and transmit a consumable level value to the print apparatus logic circuit in response to a request from the print apparatus logic circuit independent of which personality of the plurality of personalities is the selected personality.

25 Claims, 12 Drawing Sheets

(56) References Cited

U.S. PATENT DOCUMENTS

| | | | |
|---|---|---|---|
| 10,067,895 B2* | 9/2018 | Ahne | G06F 1/12 |
| 10,740,275 B1* | 8/2020 | Panshin | G06F 13/382 |
| 11,552,786 B2* | 1/2023 | Tang | H04L 9/0866 |
| 2006/0017459 A1* | 1/2006 | Kanno | H03K 19/17752 |
| | | | 326/40 |
| 2011/0032561 A1* | 2/2011 | Cachia | B41J 2/17546 |
| | | | 358/1.15 |
| 2011/0078449 A1* | 3/2011 | Starr | H04L 9/3247 |
| | | | 713/168 |
| 2015/0261481 A1* | 9/2015 | Takenaka | G06F 3/1204 |
| | | | 358/1.15 |
| 2016/0202662 A1 | 7/2016 | Wang | |
| 2017/0032135 A1* | 2/2017 | Refstrup | G06F 21/608 |
| 2017/0045508 A1* | 2/2017 | Khattak | G01N 35/10 |
| 2017/0087861 A1 | 3/2017 | Thacker | |
| 2017/0366350 A1 | 12/2017 | Ness et al. | |
| 2020/0171836 A1* | 6/2020 | Gardner | B41J 2/17546 |
| 2021/0213747 A1* | 7/2021 | Ward | G06F 13/4282 |
| 2021/0326296 A1* | 10/2021 | Panshin | H04N 1/00214 |
| 2022/0137897 A1* | 5/2022 | Hattori | G06F 3/1229 |
| | | | 358/1.15 |

FOREIGN PATENT DOCUMENTS

| | | |
|---|---|---|
| EP | 3208736 A1 | 8/2017 |
| WO | 2011/038443 A1 | 4/2011 |
| WO | 2020/117776 A1 | 6/2020 |

* cited by examiner

LOGIC CIRCUITRY PACKAGES FOR REPLACEABLE PRINT APPARATUS COMPONENTS

CROSS-REFERENCE TO RELATED APPLICATIONS

This application is a Continuation Application of PCT Application No. PCT/US2021/42096, filed Jul. 16, 2021, entitled "LOGIC CIRCUITRY PACKAGES FOR REPLACEMENT PRINT APPARATUS COMPONENTS", which is incorporated herein by reference.

BACKGROUND

Subcomponents of apparatus may communicate with one another in a number of ways. For example, Serial Peripheral Interface (SPI) protocol, Bluetooth Low Energy (BLE), Near Field Communications (NFC) or other types of digital or analog communications may be used.

Some two-dimensional (2D) and three-dimensional (3D) printing systems include one or more replaceable print apparatus components, such as print material containers (e.g., inkjet cartridges, toner cartridges, ink supplies, 3D printing agent supplies, build material supplies, etc.), inkjet printhead assemblies, and the like. In some examples, logic circuitry associated with the replaceable print apparatus component(s) communicate with logic circuitry of the print apparatus in which they are installed, for example communicating information such as their identity, capabilities, status, and the like.

DETAILED DESCRIPTION

Figure 1:
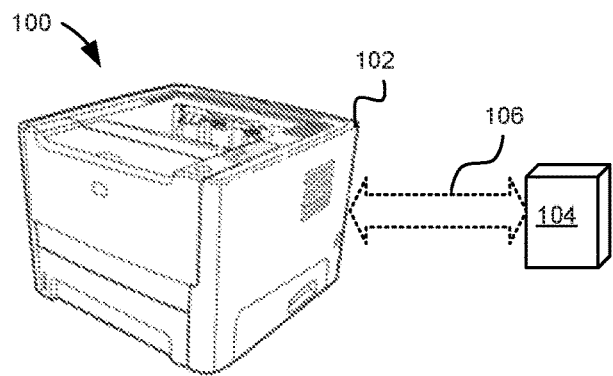
FIG. 1 illustrates one example of a printing system.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that each individual feature or combination of features of the various examples described herein may be combined, in part or whole, with each other individual feature or combination of features.

Some examples of applications described herein are in the context of print apparatus. Not all the examples, however, are limited to such applications, and at least some of the principles set out herein may be used in other contexts.

In certain examples, Inter-integrated Circuit ($I^2C$, or I2C, which notation is adopted herein) protocol allows at least one 'leader' (commonly referred to as a 'master') integrated circuit (IC) to communicate with at least one 'follower' (commonly referred to as a 'slave') IC, for example via a bus. I2C, and other communications protocols, communicate data according to a clock period. For example, a voltage signal may be generated, where the value of the voltage is associated with data. For example, a voltage value above X volts may indicate a logic "1" whereas a voltage value below X volts may indicate a logic "0", where X is a predetermined numerical value. By generating an appropriate voltage in each of a series of clock periods, data can be communicated via a bus or another communication link.

Certain example print material containers have follower logic that utilize I2C communications, although in other examples, other forms of digital or analog communications could also be used. In the example of I2C communication, a leader IC may generally be provided as part of the print apparatus (which may be referred to as the 'host') and a replaceable print apparatus component would comprise a 'follower' IC, although this need not be the case in all examples. There may be a plurality of follower ICs connected to an I2C communication link or bus (for example, containers of different colors of print agent). The follower IC(s) may include a processor to perform data operations before responding to requests from logic circuitry of the print system.

Communications between print apparatus and replaceable print apparatus components installed in the apparatus (and/or the respective logic circuitry thereof) may facilitate various functions. Logic circuitry within a print apparatus may receive information from logic circuitry associated with a replaceable print apparatus component via a communications interface, and/or may send commands to the replaceable print apparatus component logic circuitry, which may include commands to write data to a memory associated therewith, or to read data therefrom.

In at least some of the examples described below, a logic circuitry package is described. The logic circuitry package may be associated with a replaceable print apparatus component, for example being internally or externally affixed thereto, for example at least partially within the housing, and is adapted to communicate data with a print apparatus controller via a bus provided as part of the print apparatus.

A 'logic circuitry package' as the term is used herein refers to one logic circuit, or more logic circuits that may be interconnected or communicatively linked to each other. Where more than one logic circuit is provided, these may be encapsulated as a single unit, or may be separately encapsulated, or not encapsulated, or some combination thereof. The package may be arranged or provided on a single substrate or a plurality of substrates. In some examples, the package may be directly affixed to a cartridge wall. In some examples, the package may include an interface, for example including pads or pins. The package interface may be intended to connect to a communication interface of the print apparatus component that in turn connects to a print apparatus logic circuit, or the package interface may connect directly to the print apparatus logic circuit. Example packages may be configured to communicate via a serial bus interface. Where more than one logic circuit is provided, these logic circuits may be connected to each other or to the interface, to communicate through the same interface.

In some examples, each logic circuitry package is provided with at least one processor and memory. In one example, the logic circuitry package may be, or may function as, a microcontroller or secure microcontroller. In use, the logic circuitry package may be adhered to or integrated with the replaceable print apparatus component. A logic circuitry package may alternatively be referred to as a logic circuitry assembly, or simply as logic circuitry or processing circuitry.

In some examples, the logic circuitry package may respond to various types of requests (or commands) from a host (e.g., a print apparatus). One type of request may include a request for data, for example identification and/or authentication information. Another type of request may be a request for a data processing action. There may be additional types of requests. In this disclosure, a command is also a type of request.

In some examples, there may be more than one address associated with a particular logic circuitry package, which is used to address communications sent over a bus to identify the logic circuitry package which is the target of a communication (and therefore, in some examples, with a replaceable print apparatus component). In some examples, different requests are handled by different logic circuits of the package. In some examples, the different logic circuits may be associated with different addresses. For example, cryptographically authenticated communications may be associated with secure microcontroller functions and a first I2C address, while other communications may be associated with a second and/or reconfigured I2C address. In certain examples, these other communications via the second and/or reconfigured address can be scrambled or otherwise secured, not using the key used for the secure microcontroller functions.

In at least some examples, a plurality of such logic circuitry packages (each of which may be associated with a different replaceable print apparatus component) may be connected to an I2C bus. In some examples, at least one address of the logic circuitry package may be an I2C compatible address (herein after, an I2C address), for example in accordance with an I2C protocol, to facilitate directing communications between leader to followers in accordance with the I2C protocol. For example, a standard I2C communications address may be 7 or 10 bits in length. In other examples, other forms of digital and/or analog communication can be used.

FIG. 1 illustrates one example of a printing system 100. The printing system 100 includes a print apparatus 102 in communication with logic circuitry associated with a replaceable print apparatus component 104 via a communications link 106. In some examples, the communications link 106 may include an I2C capable or compatible bus (herein after, an I2C bus). Although for clarity, the replaceable print apparatus component 104 is shown as external to the print apparatus 102, in some examples, the replaceable print apparatus component 104 may be housed within the print apparatus.

The replaceable print apparatus component 104 may include, for example, a print material container or cartridge (which could be a build material container for 3D printing, a liquid or dry toner container for 2D printing, or an ink or liquid print agent container for 2D or 3D printing), which may in some examples include a print head or other dispensing or transfer component. The replaceable print apparatus component 104 may, for example, contain a consumable resource of the print apparatus 102, or a component which is likely to have a lifespan which is less (in some examples, considerably less) than that of the print apparatus 102. Moreover, while a single replaceable print apparatus component 104 is shown in this example, in other examples, there may be a plurality of replaceable print apparatus components, for example including print agent containers of different colors, print heads (which may be integral to the containers), or the like. In other examples, the print apparatus components 104 could include service components, for example to be replaced by service personnel, examples of which could include print heads, toner process cartridges, or logic circuitry packages by themselves to adhere to corresponding print apparatus components and communicate to a compatible print apparatus logic circuit.

Figure 2:
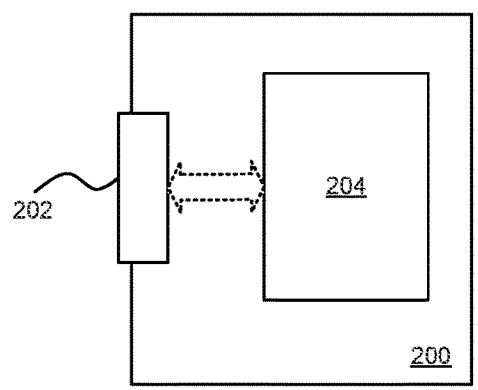
FIG. 2 illustrates one example of a replaceable print apparatus component.

FIG. 2 illustrates one example of a replaceable print apparatus component 200, which may provide the replaceable print apparatus component 104 of FIG. 1. The replaceable print apparatus component 200 includes a data interface 202 and a logic circuitry package 204. In use of the replaceable print apparatus component 200, the logic circuitry package 204 decodes data received via the data interface 202. The logic circuitry may perform other functions as set out below. The data interface 202 may include an I2C or other interface. In certain examples, the data interface 202 may be part of the same package as the logic circuitry package 204.

In some examples, the logic circuitry package 204 may be further configured to encode data for transmission via the data interface 202. In some examples, there may be more than one data interface 202 provided. In some examples, the logic circuitry package 204 may be arranged to act as a 'follower' in I2C communications.

Figure 3:
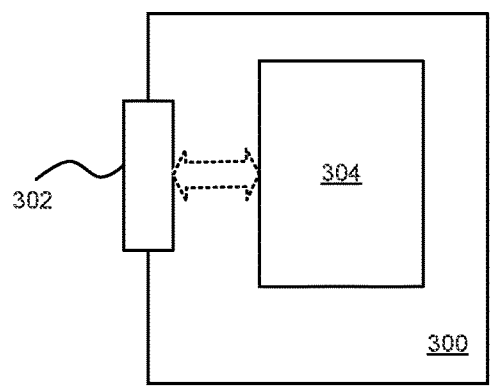
FIG. 3 illustrates one example of a print apparatus.

FIG. 3 illustrates one example of a print apparatus 300. The print apparatus 300 may provide the print apparatus 102 of FIG. 1. The print apparatus 300 may serve as a host for replaceable components. The print apparatus 300 includes an interface 302 for communicating with a replaceable print apparatus component and a print apparatus logic circuit 304, such as a controller. In some examples, the interface 302 is an I2C interface.

In some examples, the print apparatus logic circuit 304 may be configured to act as a host, or a leader, in I2C communications. The print apparatus logic circuit 304 may generate and send commands to at least one replaceable print apparatus component 200, and may receive and decode responses received therefrom. In other examples, the print apparatus logic circuit 304 may communicate with the logic circuitry package 204 using any form of digital or analog communication.

The print apparatus 102, 300 and replaceable print apparatus component 104, 200, and/or the logic circuitry thereof, may be manufactured and/or sold separately. In an example, a user may acquire a print apparatus 102, 300 and retain the apparatus 102, 300 for a number of years, whereas a plurality of replaceable print apparatus components 104, 200 may be purchased in those years, for example as print agent is used in creating a printed output. Therefore, there may be at least a degree of forwards and/or backwards compatibility between print apparatus 102, 300 and replaceable print apparatus components 104, 200. In many cases, this compatibility may be provided by the print apparatus 102, 300 as the replaceable print apparatus components 104, 200 may be relatively resource constrained in terms of their processing and/or memory capacity.

Figure 4A:
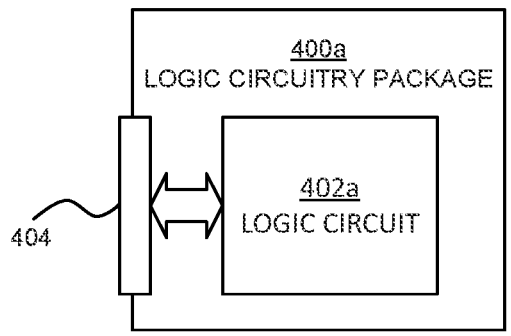
FIGS. 4A and 4B illustrate example logic circuitry packages.

FIG. 4A illustrates one example of a logic circuitry package 400a, which may for example provide the logic circuitry package 204 described in relation to FIG. 2. The logic circuitry package 400a may be associated with, or in some examples affixed to and/or be incorporated at least partially within, a replaceable print apparatus component 200.

Logic circuitry package 400a includes a logic circuit 402a and an interface 404. In some examples, the interface 404 is an I2C interface. The logic circuit 402a may be configured to include a plurality of personalities. In some examples, each personality includes a different ID and/or a different cryptographic key (e.g., symmetric key). In other examples, each personality also includes, in addition to the ID and cryptographic key, supply configuration data and/or a consumable level value. In examples where each personality does not include supply configuration data, the logic circuit is configured to include shared supply configuration data that is applicable to all the personalities. In certain examples, a portion of the supply configuration data is shared amongst different personalities while another portion of the supply configuration data is specific to and different for each individual personality. The logic circuit may be configured to include a single consumable level value that is applicable to all the personalities. The supply configuration data may include a consumable (e.g., ink, toner, 3D print agent, etc.) fill level, a color, an intended region of use, and a supply identity.

The consumable level value may be comprised of at least one field that is updated by a print apparatus logic circuit to increment or decrement, for example to a maximum and/or a minimum value, respectively, towards an exhausted state. For example, the consumable level value may be configured to increment up to one or a plurality of bytes of data, or may be configured to decrement to zero. In one example, the access mode of the consumable level value field is set to decrement or increment only, for example in a partition map of meta data of a memory of the logic circuit 402a.

A replaceable print apparatus component including logic circuitry package 400a may not be authenticated (e.g., unusable) by a printing system unless the logic circuit 402a includes a valid personality accepted by a print apparatus logic circuit of the printing system. Logic circuit 402a includes multiple personalities so that if one personality is not authenticated by a print apparatus logic circuit, another personality may be used. As will be described in more detail below, when logic circuitry package 400a is initially installed in a printing system and powered up, logic circuit 402a provides one of the plurality of personalities to the print apparatus logic circuit. If the personality is accepted by the print apparatus logic circuit, logic circuit 402a marks the accepted personality as valid. Thus, the next time the logic circuitry package 400a is powered up, logic circuit 402a may provide the previously marked as valid personality to the print apparatus logic circuit. If the personality is not authenticated by the print apparatus logic circuit, logic circuit 402a marks the personality as invalid. In this case, the next time the logic circuitry package 400a is powered up, logic circuit 402a may provide another personality that has not been marked as invalid to the print apparatus logic circuit. This process may be repeated until the print apparatus logic circuit accepts a personality or until none of the personalities have been authenticated. In other examples, if none of the personalities of logic circuit 402a are authenticated, the replaceable print apparatus component including the logic circuitry package 400a may be denied access to certain functionalities and/or services. Examples of functionalities that may be stopped or denied by the print apparatus logic circuit due to non-authentication could include printing consumable from the non-authenticated component and/or updating the consumable level value on the non-authenticated logic circuit 402a. In contrast, the print apparatus may keep providing and using consumable components associated with authenticated packages 400a.

The consumable level value(s) for each personality may correspond to the consumable level of the replaceable print apparatus component including the logic circuitry package 400a. In the example where each personality includes a consumable level value, the consumable level value of each personality may be substantially the same, independent of which personality is being used. A consumable level value may be updated on the logic circuit 402a by the print apparatus to, at least approximately, correspond to a decrementing consumable level of the component after each print job. The consumable level value may be transmitted to the print apparatus logic circuit in response to a consumable level read command from the print apparatus logic circuit and updated in response to a consumable level update command from the print apparatus logic circuit. The consumable level value may be decremented or incremented when updated. In either case, the consumable level value corresponds to a decreasing consumable material level of the replaceable print apparatus component. For example, if the consumable level value is decremented from 100 to 0 as consumable material is used, a consumable level value of 0 may indicate a depleted consumable material level. In another example, if the consumable level value is incremented from 0 to 100 as consumable material is used, a consumable level value of 100 may indicate a depleted consumable material level.

By having a single consumable level value for all the personalities or substantially the same consumable level value for each personality, no matter which personality is being used, the consumable level value corresponds to the consumable level of the replaceable print apparatus component. In some examples, once the consumable level value indicates that the consumable level of the replaceable print apparatus component is empty, the print apparatus logic circuit may deny certain functionalities to the replaceable print apparatus component, independent of which personality is being used. In this way, a user needs to acquire a new replaceable print component to continue using the functionality. In an example, the denied functionalities include printing. In other examples, if the consumable level value indicates that the consumable level of the replaceable print apparatus component is empty, the print apparatus logic circuit may continue to allow certain functionalities, such as printing, as though the replaceable print apparatus component has been refilled.

In certain examples, a logic circuit of a consumable component's logic circuitry package is configured to, when it detects that a print apparatus logic circuit does not authenticate all or a portion of its personalities, set the to-be-read consumable level value to correspond to an exhausted consumable level (e.g., a consumable level memory field may be set to all zeros or all ones). This may cause the print apparatus logic circuit to facilitate printing with the consumable component but without a full functionality set. The logic circuit may also be configured to, in addition to or instead of setting its to-be-read consumable level value to an empty state, switch to a personality pre-associated with an empty consumable level value. Certain example print apparatus logic circuits process components of which the consumable level value indicates that the component is empty as a refilled or remanufactured consumable component, which may cause the print apparatus logic circuit to facilitate printing. In certain scenarios, such assumed empty state may cause the print apparatus logic circuit and/or component's logic circuit to not execute certain other functionalities, such as the consumable level reading and/or updating. An advantage may be that after some or all personalities are not authenticated, the consumable component may at least be used for printing, thereby preventing that the consumable component cannot be used for printing from a certain print apparatus. In certain examples, the logic circuit of the logic circuitry package may be configured to mimic an exhausted state, by setting a to-be-read consumable level byte field of the logic circuit to all zeros or all ones (e.g., corresponding to a decrementing or incrementing value, respectively), whereby in some instances that byte field cannot be overwritten. In most of these instances the actual consumable level, which is not empty, does not correspond to the indicated consumable level value on the logic circuit, which indicates an empty state.

Figure 4B:
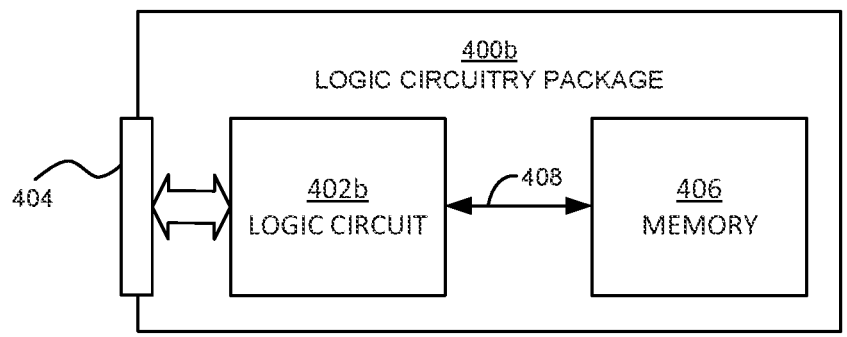

FIG. 4B illustrates another example of a logic circuitry package 400b. The logic circuitry package 400b may be associated with, or in some examples affixed to and/or be incorporated at least partially within, a replaceable print apparatus component 200. Logic circuitry package 400b includes a logic circuit 402b, an interface 404, and a memory 406. Logic circuit 402b is communicatively coupled to memory 406 through a communication link 408. Memory 406 may include a single or multiple memory devices, and may include any or any combination of volatile memory (e.g., DRAM, SRAM, registers, etc.) and non-volatile memory (e.g., ROM, EEPROM, Flash, EPROM, memristor, etc.). In some examples, memory 406 stores the plurality of personalities including the IDs and cryptographic keys, the supply configuration data, and the consumable level value(s). Logic circuitry package 400b operates similarly to logic circuitry package 400a of FIG. 4A.

Figure 5:
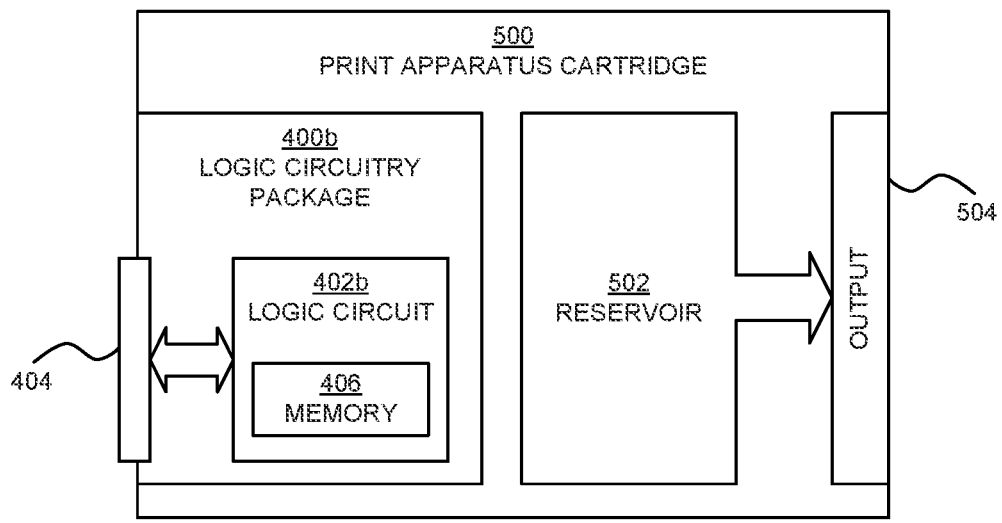
FIG. 5 illustrates one example of a print apparatus cartridge.

FIG. 5 illustrates one example of a print apparatus cartridge 500. Print apparatus cartridge 500 may provide the replaceable print apparatus component 104 of FIG. 1 or the replaceable print apparatus component 200 of FIG. 2. Print apparatus cartridge 500 includes a logic circuitry package 400b including logic circuit 402b, interface 404, and memory 406. In this example, logic circuit 402b includes the memory 406. In addition, print apparatus cartridge 500 includes a reservoir 502 to hold consumable material and an output 504 to dispense the consumable material. The consumable material may include ink, dry toner, liquid toner, a 3D print agent (e.g., a print enhancement agent, a print inhibiting agent, a build powder, such as a plastic powder or a metal powder), or another suitable consumable. As consumable material is dispensed through output 504 for multiple subsequent print jobs, the consumable level value of logic circuit 402b (e.g., as stored in memory 406) is updated to correspond to the decreasing consumable level.

Figure 6A:
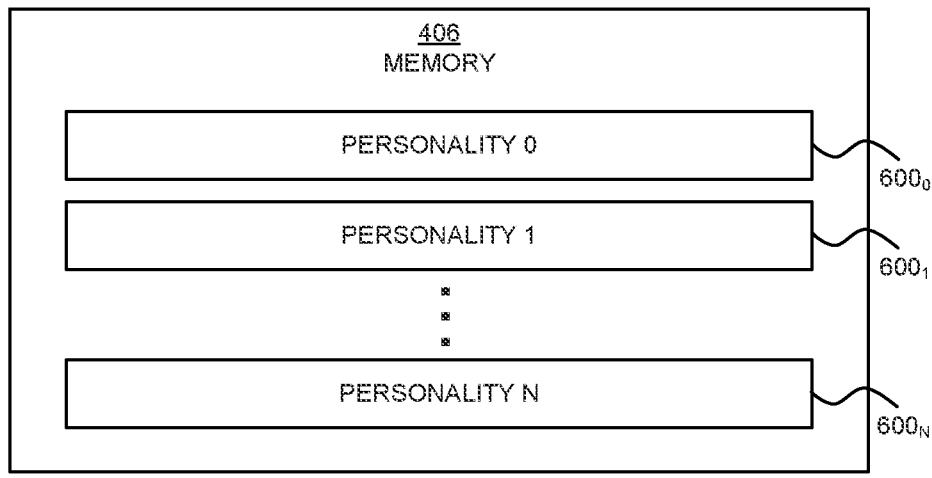
FIG. 6A illustrates one example of a memory storing a plurality of personalities.

FIG. 6A illustrates one example of a memory 406 storing a plurality of personalities $600_0$ to $600_N$, wherein "N" is any suitable number of personalities, such as 2 or more (e.g., 2, 3, 4, 5 or more). In some examples, the plurality of personalities $600_0$ to $600_N$ are written to the memory 406 at the time of manufacture of the logic circuitry package. In other examples, the logic circuit 402a (FIG. 4A) or 402b (FIG. 4B or 5) is configured to generate and/or update the plurality of personalities $600_0$ to $600_N$.

Figure 6B:
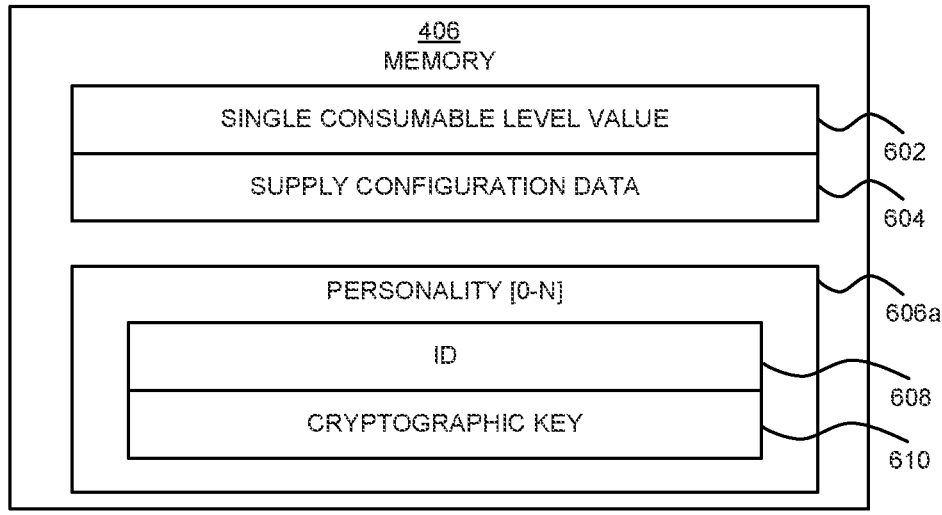
FIGS. 6B and 6C illustrate example personalities and corresponding data.

FIG. 6B illustrates one example of the plurality of personalities $600_0$ to $600_N$ (indicated by 606a) and corresponding data. In this example, each personality [0-N] 606a (i.e., each personality $600_0$ to $600_N$) includes a different ID 608 and a different cryptographic key 610. In addition, memory 406 stores a single consumable level value 602 and supply configuration data 604 that are shared by and apply to each personality [0-N] 606a.

Figure 6C:
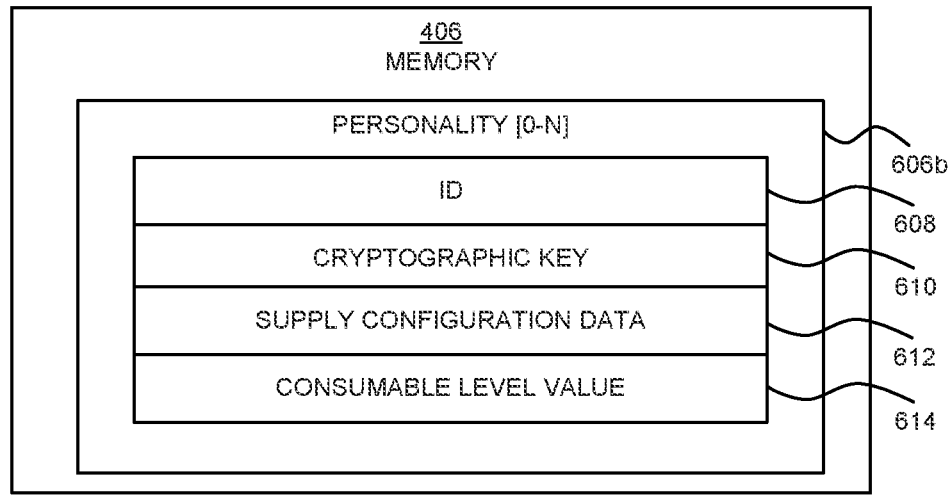

FIG. 6C illustrates another example of the plurality of personalities $600_0$ to $600_N$ (indicated by 606b). In this example, each personality [0-N] 606b (i.e., each personality $600_0$ to $600_N$) includes a different ID 608, a different cryptographic key 610, supply configuration data 612, and a consumable level value 614. The supply configuration data 612 for each personality [0-N] 606b may be the same or different. As previously described, the consumable level value 614 for each personality [0-N] 606b is substantially the same and correspond to the consumable material level of the replaceable print apparatus component.

Figure 7:
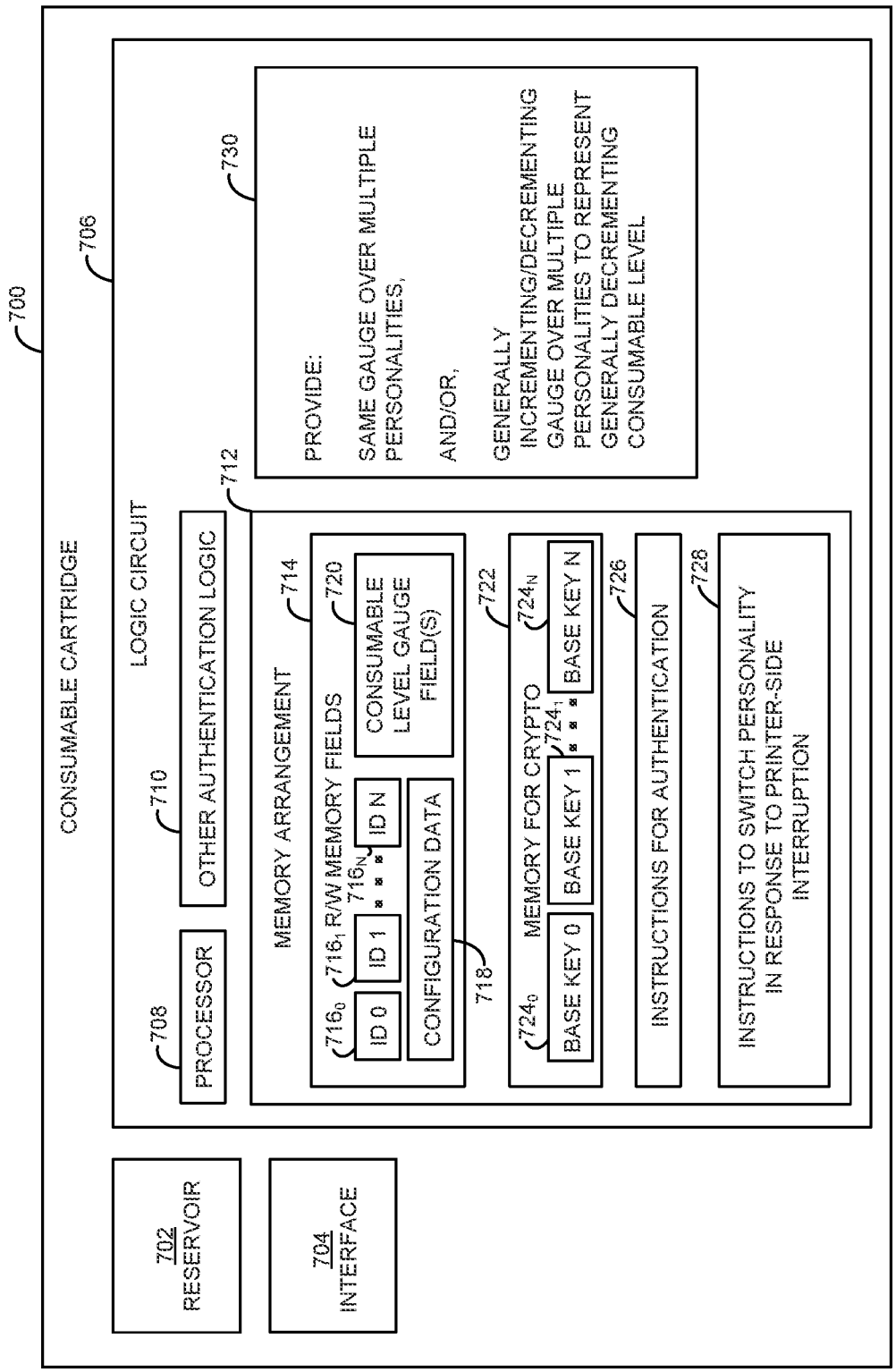
FIG. 7 illustrates one example of a consumable cartridge.

FIG. 7 illustrates one example of a consumable cartridge 700. Consumable cartridge 700 may provide the replaceable print apparatus component 104 of FIG. 1, the replaceable print apparatus component 200 of FIG. 2, or the print apparatus cartridge 500 of FIG. 5. Consumable cartridge 700 includes a reservoir 702 containing consumable material, a logic circuit interface 704 to communicate with a host print apparatus logic circuit, and a logic circuit 706. The consumable material may include ink, dry toner, liquid toner, or a 3D print agent. The reservoir 702 may be connected to an output (not shown) to dispense the consumable material from reservoir 702. Interface 704 may be an I2C interface or another suitable interface for communicating with a host print apparatus logic circuit.

Logic circuit 706 includes a processor 708, other authentication logic 710, and a memory arrangement 712. Memory arrangement 712 includes read/write (R/W) memory fields 714, memory for cryptography 722, and instructions 726 and 728. In one example, memory arrangement 712 may include a single or multiple memory devices, and may include any or any combination of volatile memory (e.g., DRAM, SRAM, registers, etc.) and non-volatile memory (e.g., ROM, EEPROM, Flash, EPROM, memristor, etc.). The R/W memory fields 714 store a plurality of IDs $716_0$ to $716_N$ corresponding to a plurality of personalities, configuration data 718 (e.g., supply configuration data) corresponding to the plurality of personalities, and consumable level gauge field(s) 720 corresponding to the plurality of personalities.

Memory for cryptography 722 stores a plurality of base keys $724_0$ to $724_N$. Each base key $724_0$ to $724_N$ corresponds to an ID $716_0$ to $716_N$ corresponding to the plurality of personalities, respectively. In some examples, each base key $724_0$ to $724_N$ includes a different cryptographic key (e.g., symmetric key) and/or a different seed value from which a cryptographic key may be derived. Each base key $724_0$ to $724_N$ also includes a corresponding base key ID to identify the cryptographic key. In other examples, multiple IDs and a single shared symmetric master key may be stored from which each of the base keys could be derived on demand and from each base key a session key could be derived as needed. Instructions 726 are instructions for authenticating the logic circuit 706 to a print apparatus logic circuit. Instructions 728 are instructions to switch the personality in response to a printer-side interruption. A printer-side interruption may include a time out or communication stop or the like. A printer-side interruption may include denying access to certain functionalities, including printing consumable from the component and/or using the consumable level feature, by a failure of the print apparatus logic circuit to authenticate the logic circuit 706.

Processor 708 executes instructions to control the operation of logic circuit 706 including the instructions 726 and 728 and instructions for accessing memory arrangement 712 for read and/or write operations. Processor 708 may respond to external requests or commands from a print apparatus logic circuit (e.g., through interface 704) to return data (e.g., the consumable level value, an ID of a selected personality, a base key ID, supply configuration data, challenge data, integrity test data, status data, etc.), update data (e.g., the consumable level value), and/or initiate a function (e.g., start a cryptographic session). Processor 708 may also respond to internal requests or commands within logic circuit 706 to generate and/or update the plurality of personalities, mark a personality as accepted or rejected, switch personalities, and/or update the consumable level gauge field(s) 720. As indicated at 730, logic circuit 706 is configured to provide the same gauge (e.g., update consumable level gauge field(s) 720) over multiple personalities and/or generally increment/decrement the gauge over multiple personalities to represent a generally decreasing consumable level (e.g., corresponding to the level of consumable material remaining in reservoir 702). The other authentication logic 710 may include high speed calculator logic to process predetermined iterative calculations and/or other logic to process authentication algorithms. In some examples, the other authentication logic 710 may execute the instructions for authentication 726 or a portion of the instructions for authentication 726.

FIGS. 8A-8K are flow diagrams illustrating example methods 800 that may be carried out by a logic circuit, such as the logic circuit 400a, 400b, or 706 of FIG. 4A, 4B, 5, or 7. The logic circuit may be part of a logic circuitry package for a replaceable print apparatus component (e.g., 500 of FIG. 5 or 700 of FIG. 7) including an interface (e.g., 404 of FIG. 4A, 4B, or 5; or 704 of FIG. 7) to communicate with a print apparatus logic circuit (e.g., 304 of FIG. 3) as previously described. In this example, the logic circuit may be configured to include a plurality of personalities (e.g., $600_0$ to $600_N$ of FIG. 6A), where each personality of the plurality of personalities includes an ID (e.g., 608 of FIG. 6B or $716_0$ to $716_N$ of FIG. 7) and a cryptographic key (e.g., 610 of FIG. 6B or $724_0$ to $724_N$ of FIG. 7).

Figure 8A:
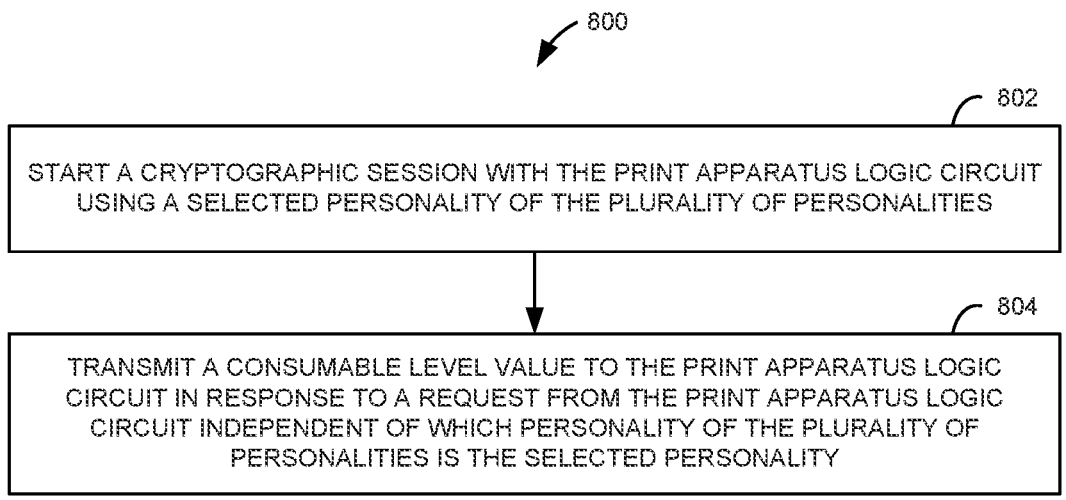
FIGS. 8A-8K are flow diagrams illustrating example methods that may be carried out by a logic circuit.

As illustrated in FIG. 8A at 802, the logic circuit may be configured to start a cryptographic session with the print apparatus logic circuit using a selected personality of the plurality of personalities (e.g., using the cryptographic key corresponding to the selected personality). At 804, the logic circuit may be configured to transmit a consumable level value (e.g., 602 of FIG. 6B or 720 of FIG. 7) to the print apparatus logic circuit in response to a request from the print apparatus logic circuit independent of which personality of the plurality of personalities is the selected personality.

Figure 8B:
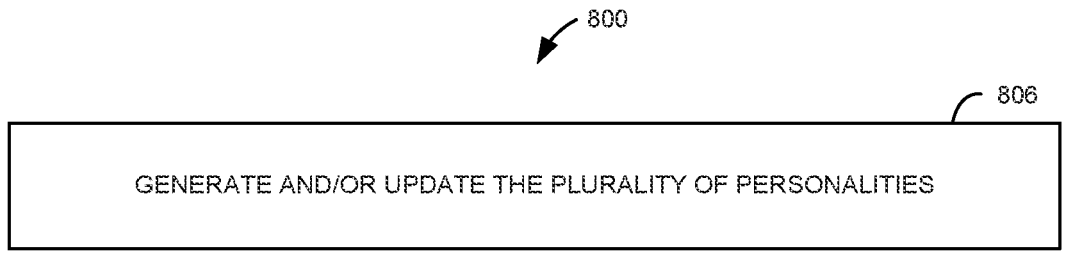
Figure 8C:
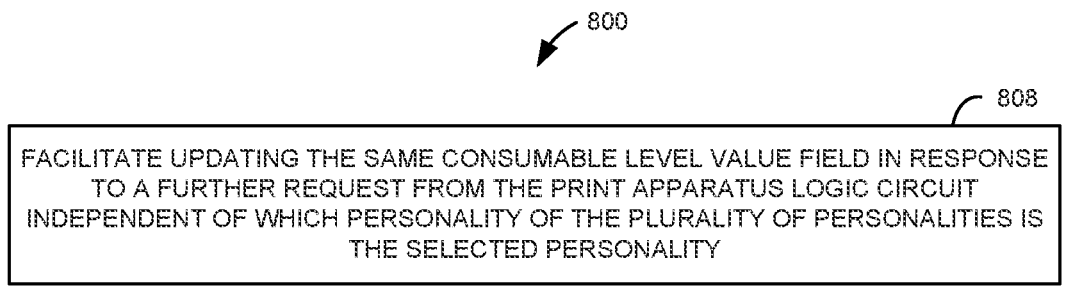

As illustrated in FIG. 8B at 806, the logic circuit may be further configured to generate and/or update the plurality of personalities. As illustrated in FIG. 8C at 808, the logic circuit may be further configured to facilitate updating the same consumable level value field in response to a further request from the print apparatus logic circuit independent of which personality of the plurality of personalities is the selected personality.

Figure 8D:
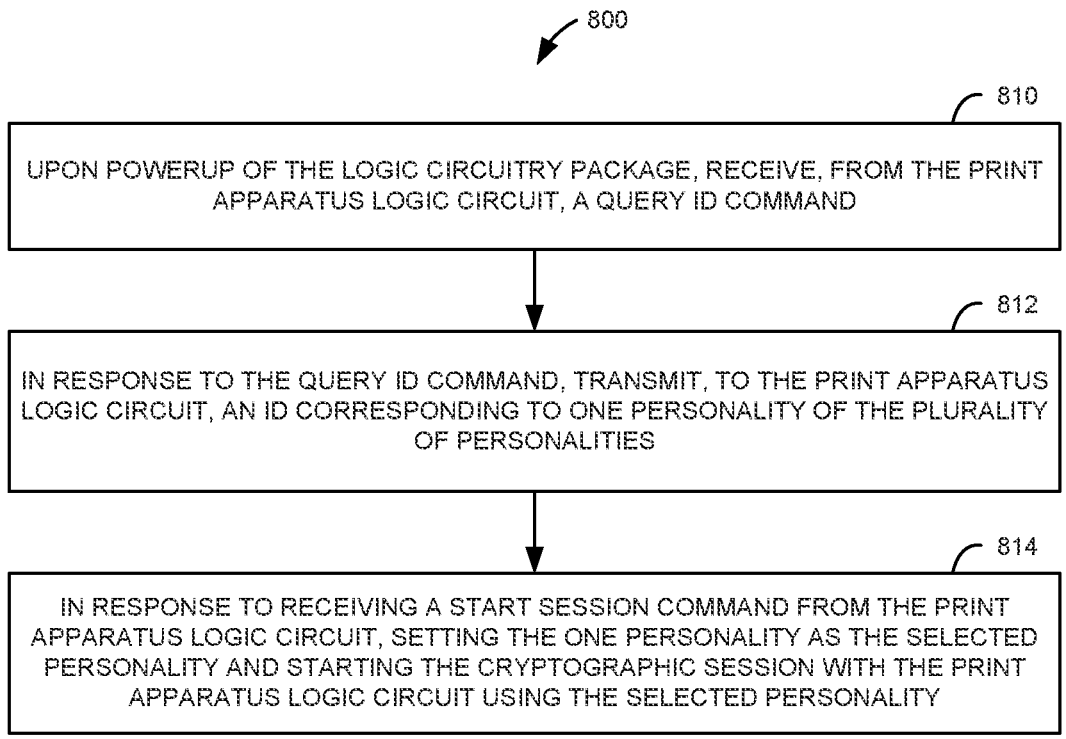

As illustrated in FIG. 8D at 810, the logic circuit may be further configured to upon powerup of the logic circuitry package, receive, from the print apparatus logic circuit, a query ID command. At 812, the logic circuit may be further configured to in response to the query ID command, transmit, to the print apparatus logic circuit, an ID (e.g., 608 of FIG. 6B or $716_0$ to $716_N$ of FIG. 7) corresponding to one personality of the plurality of personalities. At 814, the logic circuit may be further configured to in response to receiving a start session command from the print apparatus logic circuit (which indicates the print apparatus logic circuit accepts the personality), setting the one personality as the selected personality and starting the cryptographic session with the print apparatus logic circuit using the selected personality.

Figure 8E:
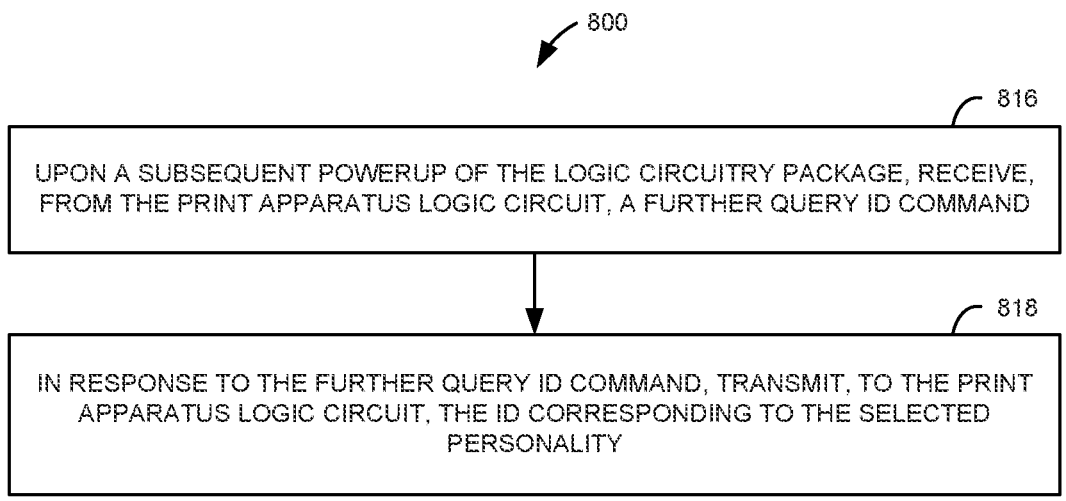

As illustrated in FIG. 8E at 816, the logic circuit may be further configured to upon a subsequent powerup of the logic circuitry package, receive, from the print apparatus logic circuit, a further query ID command. At 818, the logic circuit may be further configured to in response to the further query ID command, transmit, to the print apparatus logic circuit, the ID corresponding to the selected personality.

Figure 8F:
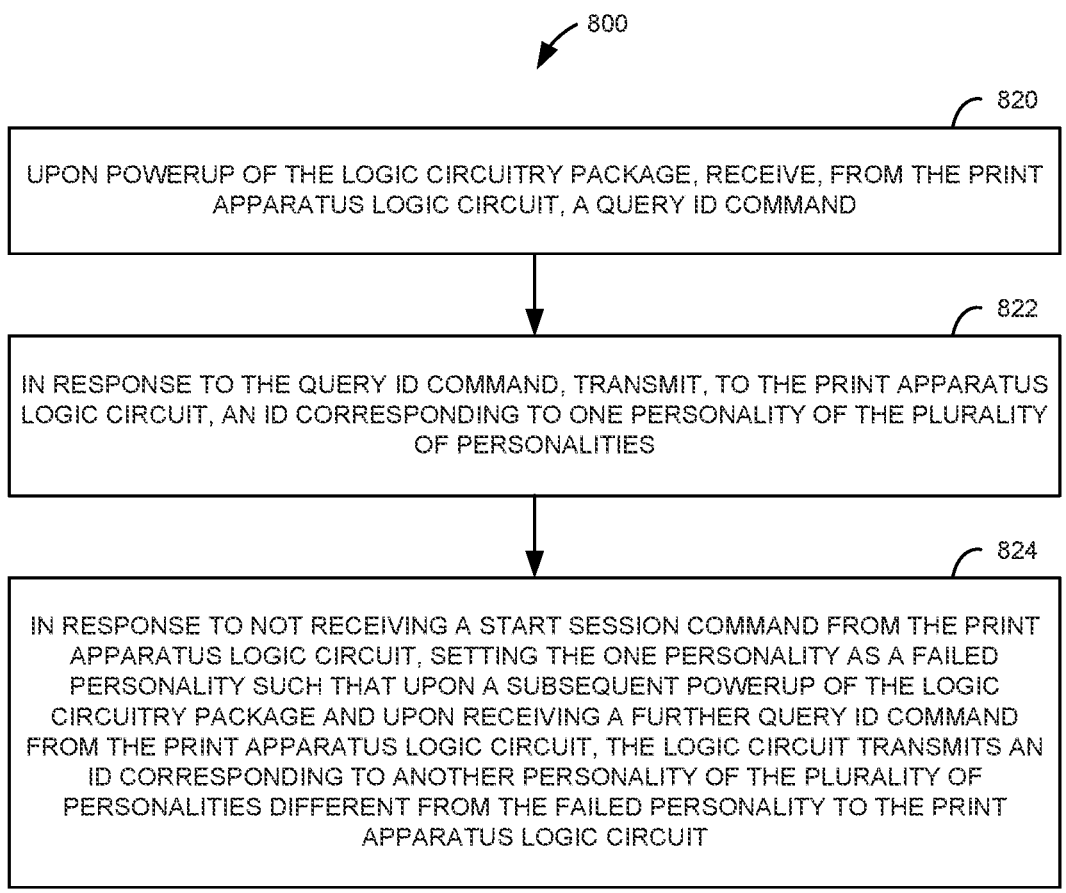

As illustrated in FIG. 8F at 820, the logic circuit may be further configured to upon powerup of the logic circuitry package, receive, from the print apparatus logic circuit, a query ID command. At 822, the logic circuit may be further configured to in response to the query ID command, transmit, to the print apparatus logic circuit, an ID corresponding to one personality of the plurality of personalities. At 824, the logic circuit may be further configured to in response to not receiving a start session command from the print apparatus logic circuit (which indicates the print apparatus logic circuit has not authenticated the personality), setting the one personality as a failed personality such that upon a subsequent powerup of the logic circuitry package and upon receiving a further query ID command from the print apparatus logic circuit, the logic circuit transmits an ID corresponding to another personality of the plurality of personalities different from the failed personality to the print apparatus logic circuit.

Figure 8G:
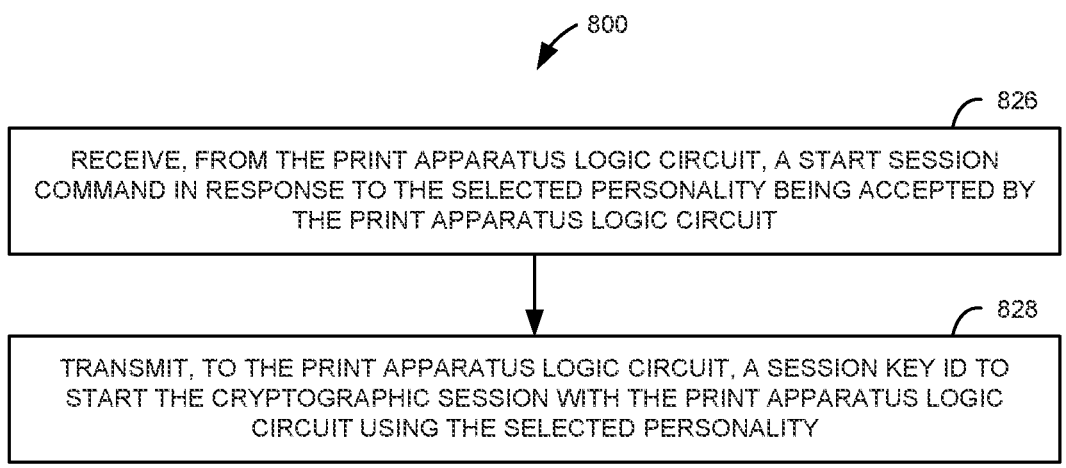

As illustrated in FIG. 8G at 826, the logic circuit may be further configured to receive, from the print apparatus logic circuit, a start session command in response to the selected personality being accepted by the print apparatus logic circuit. At 828, the logic circuit may be further configured to transmit, to the print apparatus logic circuit, a session key ID (e.g., a key ID identifying the cryptographic key corresponding to the selected personality) to start the cryptographic session with the print apparatus logic circuit using the selected personality.

Figure 8H:
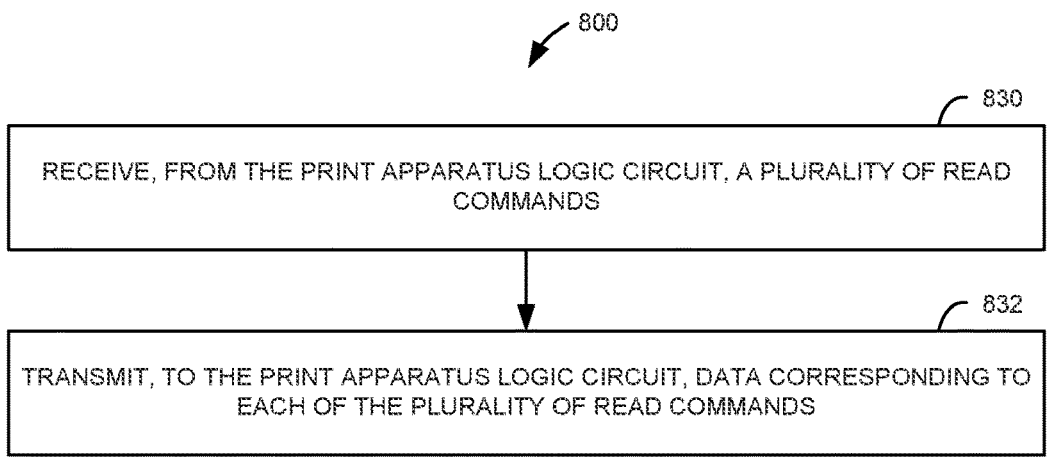

As illustrated in FIG. 8H at 830, the logic circuit may be further configured to receive, from the print apparatus logic circuit, a plurality of read commands. At 832, the logic circuit may be further configured to transmit, to the print apparatus logic circuit, data corresponding to each of the plurality of read commands. In some examples, the read commands may address fields within memory 406 of FIGS. 4B-6C or memory arrangement 712 of FIG. 7, such as supply configuration data or a consumable level value.

Figure 8I:
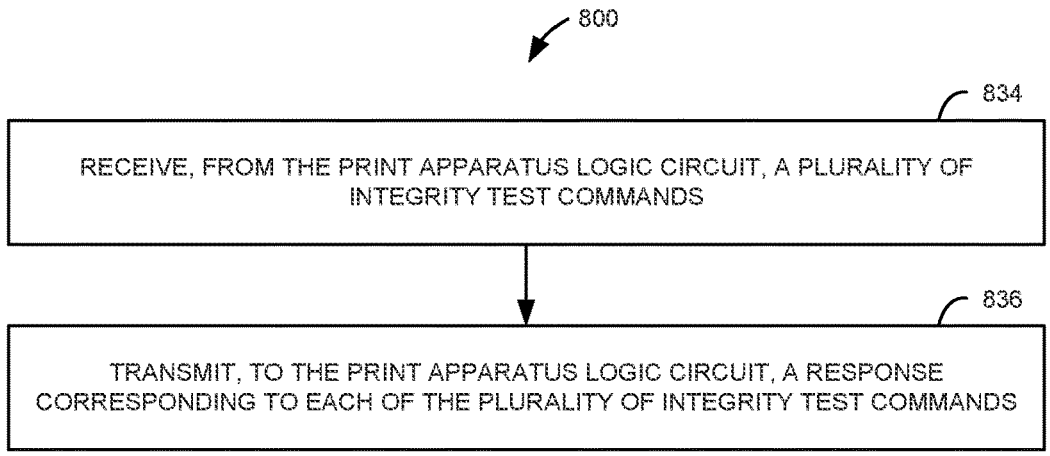

As illustrated in FIG. 8I at 834, the logic circuit may be further configured to receive, from the print apparatus logic circuit, a plurality of integrity test commands. At 836, the logic circuit may be further configured to transmit, to the print apparatus logic circuit, a response corresponding to each of the plurality of integrity test commands. In some examples, the integrity test commands may be used by the print apparatus logic circuit to verify the integrity of the logic circuit of the logic circuitry package, such as the logic circuit's ability to communicate with the print apparatus logic circuit.

Figure 8J:
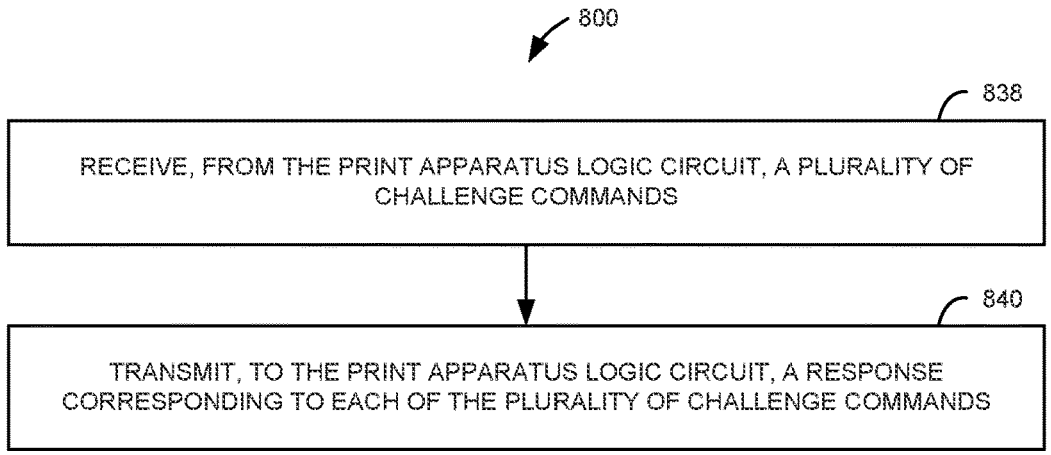

As illustrated in FIG. 8J at 838, the logic circuit may be further configured to receive, from the print apparatus logic circuit, a plurality of challenge commands. At 840, the logic circuit may be further configured to transmit, to the print apparatus logic circuit, a response corresponding to each of the plurality of challenge commands. In some examples, the challenge commands may be used by the print apparatus logic circuit to further test the authenticity of the logic circuit of the logic circuitry package.

Figure 8K:
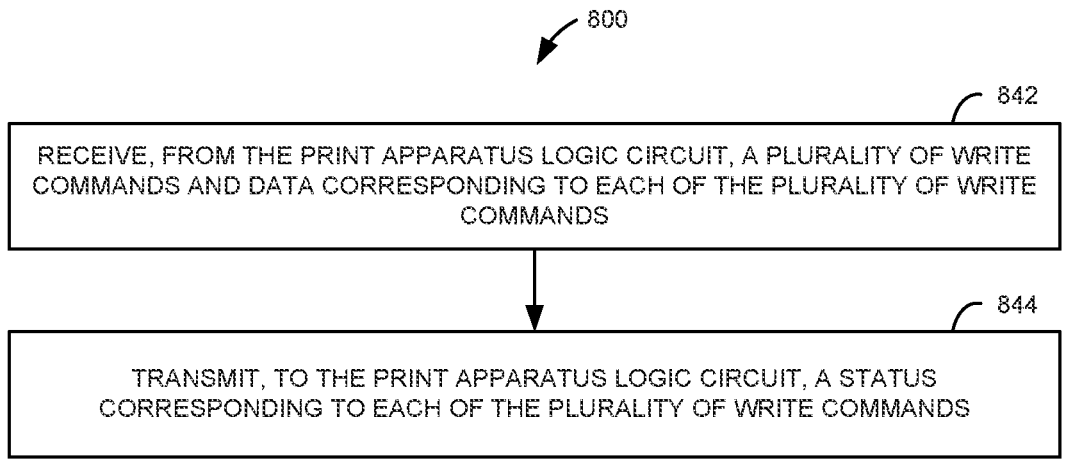

As illustrated in FIG. 8K at 842, the logic circuit may be further configured to receive, from the print apparatus logic circuit, a plurality of write commands and data corresponding to each of the plurality of write commands. At 844, the logic circuit may be further configured to transmit, to the print apparatus logic circuit, a status (e.g., write successful) corresponding to each of the plurality of write commands. In some examples, the write commands may address fields within memory 406 of FIGS. 4B-6C or memory arrangement 712 of FIG. 7, such as a consumable level value(s).

Figure 9A:
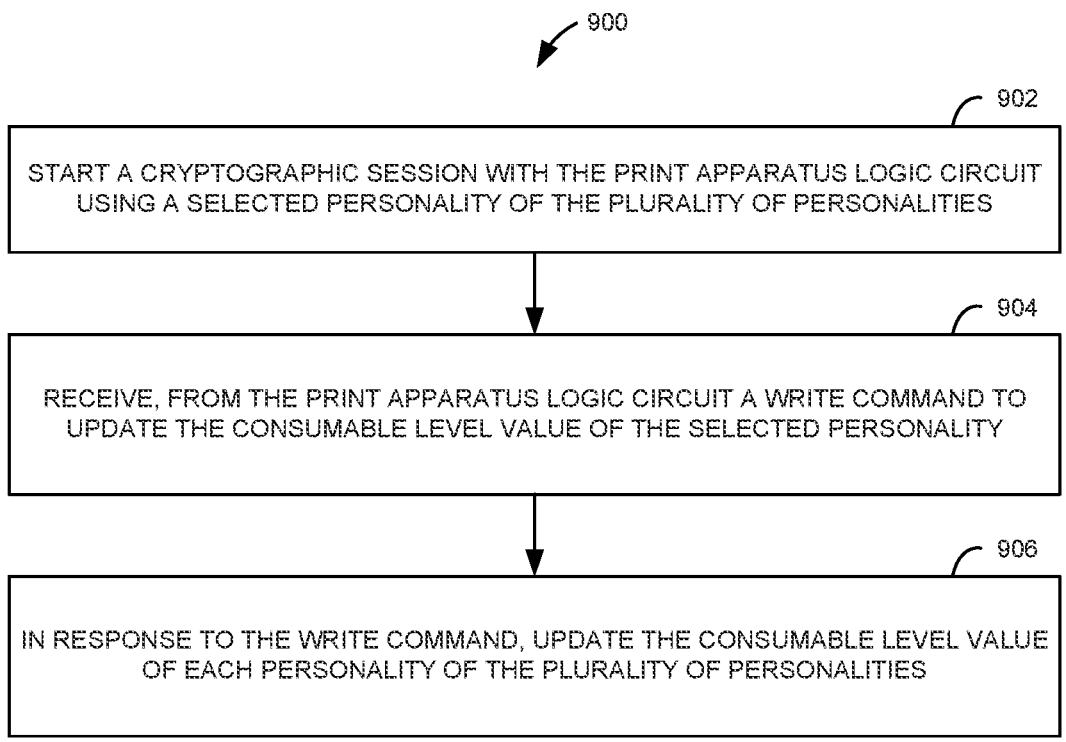
FIGS. 9A and 9B are flow diagrams illustrating other example methods that may be carried out by a logic circuit.
Figure 9B:
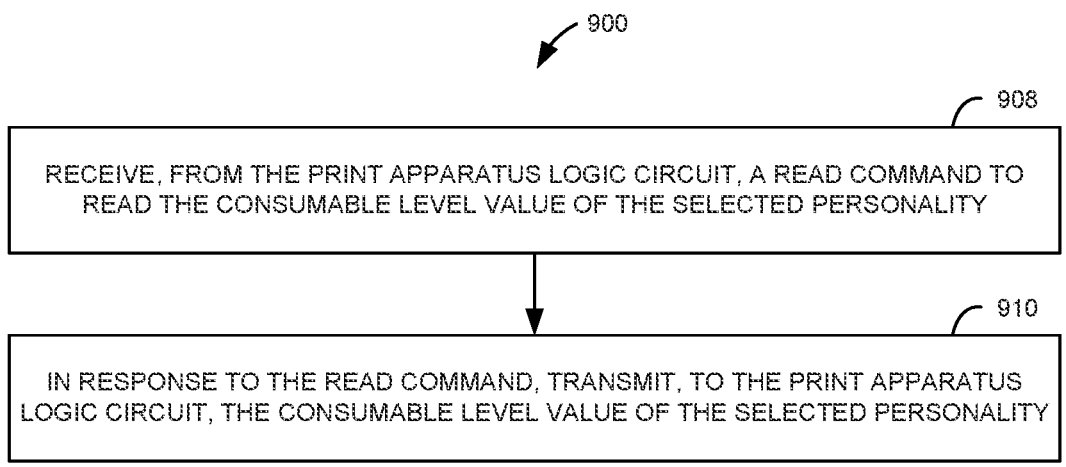

FIGS. 9A and 9B are flow diagrams illustrating other example methods 900 that may be carried out by a logic circuit, such as the logic circuit 400a, 400b, or 706 of FIG. 4A, 4B, 5, or 7. The logic circuit may be part of a logic circuitry package for a replaceable print apparatus component (e.g., 500 of FIG. 5 or 700 of FIG. 7) including an interface (e.g., 404 of FIG. 4A, 4B, or 5; or 704 of FIG. 7) to communicate with a print apparatus logic circuit (e.g., 304 of FIG. 3). In this example, the logic circuit may include a memory (e.g., 406 of FIG. 6A) storing a plurality of personalities (e.g., $600_0$ to $600_N$ of FIG. 6A). Each personality of the plurality of personalities may include an ID (e.g., 608 of FIG. 6C or $716_0$ to $716_N$ of FIG. 7), a cryptographic key (e.g., 610 of FIG. 6C or $724_0$ to $724_N$ of FIG. 7), supply configuration data (e.g., 612 of FIG. 6C or 718 of FIG. 7), and a consumable level value (e.g., 614 of FIG. 6C or 720 of FIG. 7).

As illustrated in FIG. 9A at 902, the logic circuit may be configured to start a cryptographic session with the print apparatus logic circuit using a selected personality of the plurality of personalities (e.g., using the cryptographic key corresponding to the selected personality). At 904, the logic circuit may be configured to receive, from the print apparatus logic circuit a write command to update the consumable level value of the selected personality. At 906, the logic circuit may be configured to in response to the write command, update the consumable level value of each personality of the plurality of personalities. In this way, the consumable level value of each personality is substantially the same (e.g., within 1% to 5% of each other) or identical, thus acting similar to a single consumable level value independent of which personality is the selected personality.

As illustrated in FIG. 9B at 908, the logic circuit may be further configured to receive, from the print apparatus logic circuit, a read command to read the consumable level value of the selected personality. At 910, the logic circuit may be further configured to in response to the read command, transmit, to the print apparatus logic circuit, the consumable level value of the selected personality.

Figure 10A:
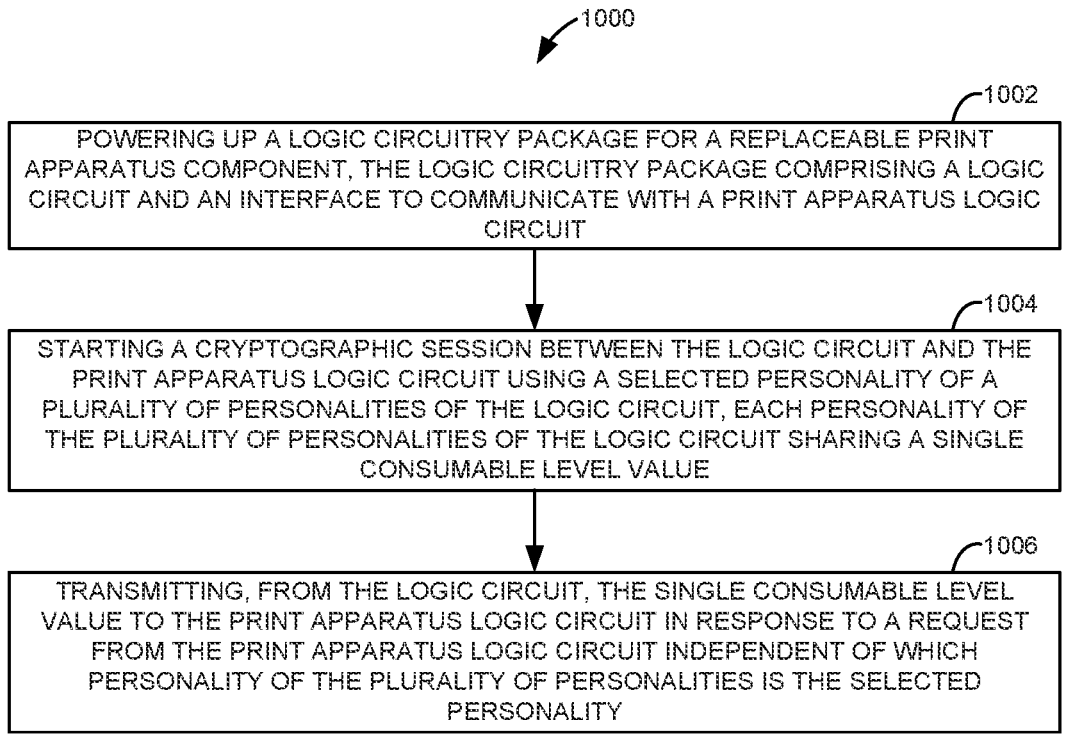
FIGS. 10A and 10B are flow diagrams illustrating example methods for operating a printing system.
Figure 10B:
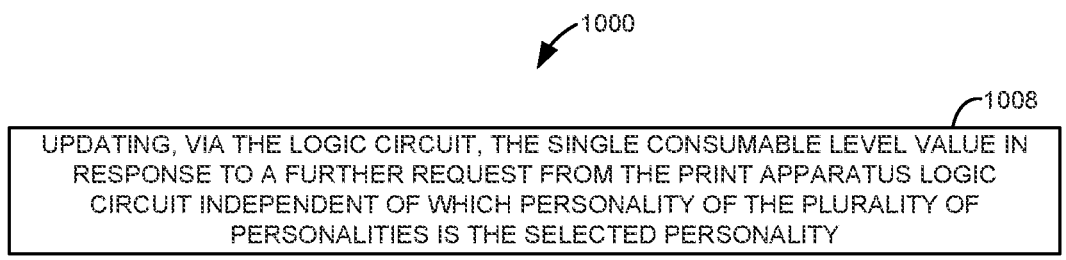

FIGS. 10A and 10B are flow diagrams illustrating an example method 1000 for operating a printing system, such as printing system 100 of FIG. 1. As illustrated in FIG. 10A at 1002, method 1000 may include powering up a logic circuitry package (e.g., 400a of FIG. 4A or 400b of FIG. 4B) for a replaceable print apparatus component (e.g., 500 of FIG. 5 or 700 of FIG. 7), the logic circuitry package comprising a logic circuit (e.g., 402a of FIG. 4A or 402b of FIG. 4B) and an interface (e.g., 404 of FIG. 4A or 4B) to communicate with a print apparatus logic circuit (e.g., 304 of FIG. 3). At 1004, method 1000 may include starting a cryptographic session between the logic circuit and the print apparatus logic circuit using a selected personality of a plurality of personalities (e.g., $600_0$ to $600_N$ of FIG. 6A) of the logic circuit, each personality of the plurality of personalities of the logic circuit sharing a single consumable level value (e.g., 602 of FIG. 6B). At 1006, method 1000 may include transmitting, from the logic circuit, the single consumable level value to the print apparatus logic circuit in response to a request from the print apparatus logic circuit independent of which personality of the plurality of personalities is the selected personality. As illustrated in FIG. 10B at 1008, method 1000 may further include updating, via the logic circuit, the single consumable level value in response to a further request from the print apparatus logic circuit independent of which personality of the plurality of personalities is the selected personality.

FIGS. 11A-11D are flow diagrams illustrating other example methods 1100 that may be carried out by a logic circuit, such as the logic circuit 400a, 400b, or 706 of FIG. 4A, 4B, 5, or 7. The logic circuit may be part of a logic circuitry package for a replaceable print apparatus component (e.g., 500 of FIG. 5 or 700 of FIG. 7) including an interface (e.g., 404 of FIG. 4A, 4B, or 5; or 704 of FIG. 7) to communicate with a print apparatus logic circuit (e.g., 304 of FIG. 3). The replaceable print apparatus component may include a reservoir (e.g., 502 of FIG. 5 or 702 of FIG. 7) containing consumable material and a consumable material output (e.g., 504 of FIG. 5) to dispense the consumable material.

Figure 11A:
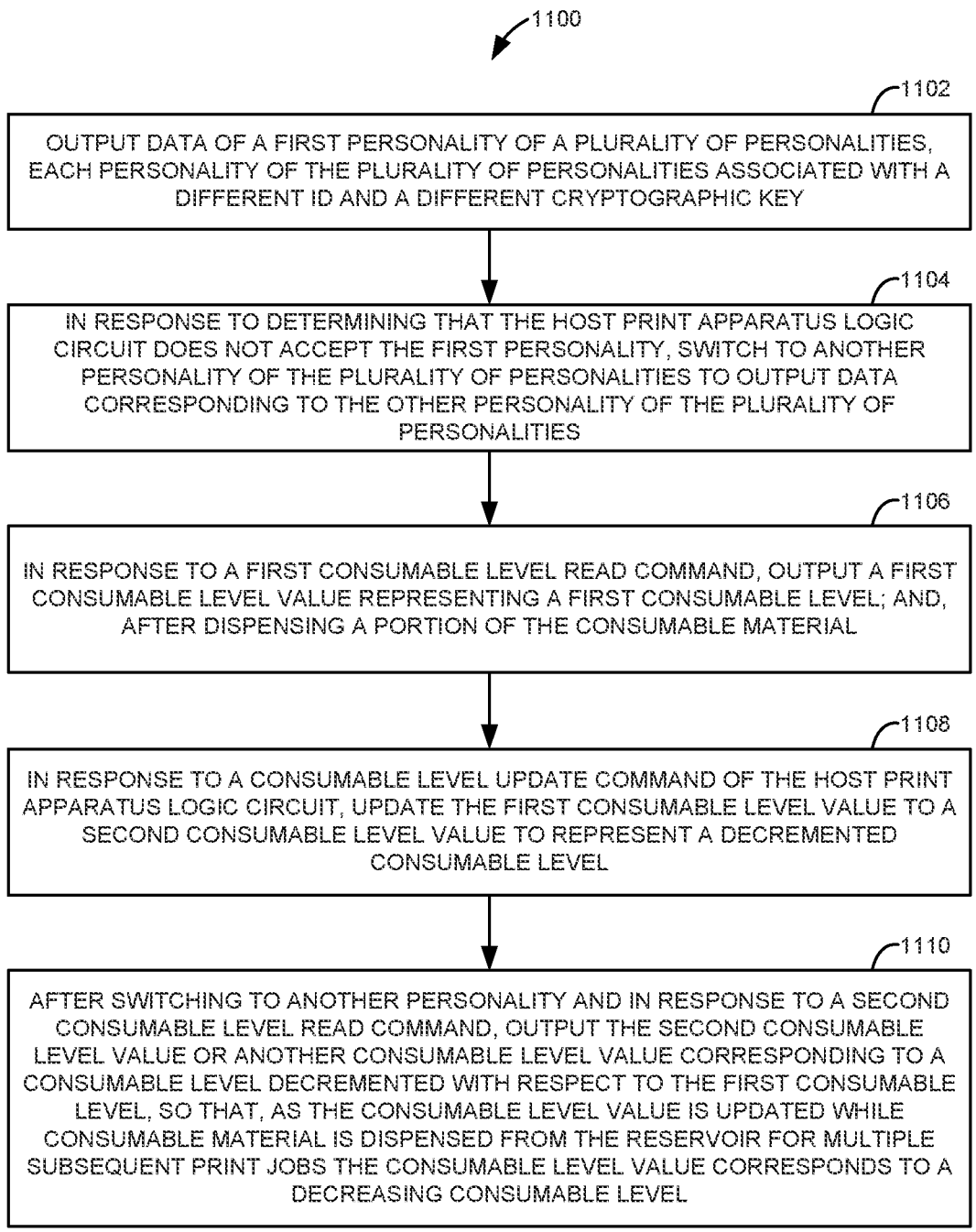
FIGS. 11A-11D are flow diagrams illustrating other example methods that may be carried out by a logic circuit.

As illustrated in FIG. 11A at 1102, the logic circuit may be configured to output data of a first personality of a plurality of personalities (e.g., $600_0$ to $600_N$ of FIG. 6A), each personality of the plurality of personalities associated with a different ID (e.g., 608 of FIG. 6B or $716_0$ to $716_N$ of FIG. 7) and a different cryptographic key (e.g., 610 of FIG. 6B or $724_0$ to $724_N$ of FIG. 7). At 1104, the logic circuit may be configured to in response to determining that the host print apparatus logic circuit does not accept the first personality, switch to another personality of the plurality of personalities to output data corresponding to the other personality of the plurality of personalities. In one example, determining that the host print apparatus logic circuit does not accept one of the plurality of personalities includes at least one of 1) detecting exceeding of a time period between an authentication response to the host print apparatus logic circuit and a subsequent command to the logic circuit, and 2) a host print apparatus logic circuit power cycle. Alternatively, the logic circuit could be configured to present at random one of its population of personalities to the host print apparatus logic circuit and continue doing so except when it has marked one personality as having been successfully accepted by this particular host. If a personality has been accepted, as indicated by the receipt of a start session command, the logic circuit may mark in non-volatile memory the personality ID and continue to use the personality in subsequent sessions with this particular host.

At 1106, the logic circuit may be configured to in response to a first consumable level read command, output a first consumable level value representing a first consumable level; and, after dispensing a portion of the consumable material, at 1108, the logic circuit may be configured to in response to a consumable level update command of the host print apparatus logic circuit, update the first consumable level value to a second consumable level value to represent a decremented consumable level. For example, the print apparatus logic circuit writes the first, and later, second, consumable level value to a consumable level value field that is associated with the selected personality and/or the plurality of personalities. At 1110, the logic circuit may be configured to after switching to another personality and in response to a second consumable level read command, output the second consumable level value or another consumable level value corresponding to a consumable level decremented with respect to the first consumable level, so that, as the consumable level value is updated while consumable material is dispensed from the reservoir for multiple subsequent print jobs the consumable level value corresponds to a decreasing consumable level.

In one example, the logic circuit includes at least one memory field including the consumable level value (e.g., 720 of FIG. 7). The at least one memory field has an address, so that consumable level read or write commands may be directed to the address. For example, the address may be indicated in meta data of the memory of the logic circuit. For example, the memory address is associated with an access mode in the meta data. The access mode may be set to increment or decrement only. In this example, outputting the consumable level value in response to the first consumable level read command includes facilitating a read of a value stored in the addressed at least one memory field. In addition, outputting the second consumable level value after switching to the other personality, in response to the second consumable level read command, includes facilitating a read of a second value stored in the addressed at least one memory field as last updated by the host print apparatus logic circuit. Further, outputting the other consumable level value after switching to the other personality, in response to the second consumable level read command, includes facilitating a read of another value similar to a value last updated by the host print apparatus logic circuit from the addressed at least one memory field. In some examples, the access mode of the at least one memory field is set to facilitate updating the value stored in the at least one memory field in one count direction only (e.g., increment only or decrement only), to represent a generally decrementing consumable level as consumable material is consumed.

The value similar to the one last updated by the print apparatus logic circuit may be, for example, the second consumable level value or any value last updated with respect to another personality. For example, the same consumable level value field may be updated at or after each print job. Then again, certain examples may use different consumable level value fields associated with different personalities where after switching personality the consumable level value may not be exactly the same as the last updated value for the previous personality. The logic circuit may be configured to, when switching the consumable level value field when switching personality, update or choose the new consumable level value to be approximately the same, which includes values that may be a bit different. In certain instances, when switching personalities the consumable level value may turn out to decrement or increment so as to show a slightly incrementing consumable level value but generally the consumable level value transmitted over the lifetime of the consumable component may correspond to a decrementing consumable level.

Figure 11B:
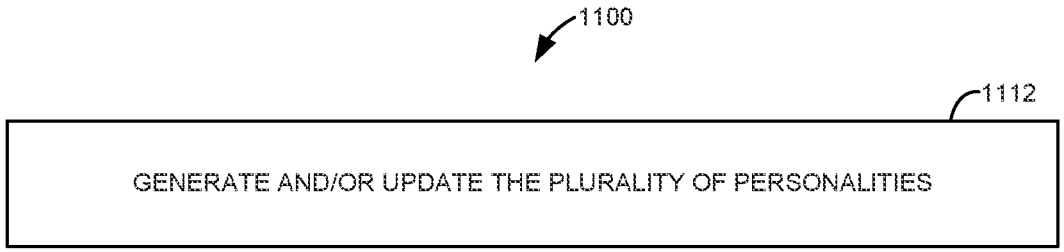
Figure 11C:
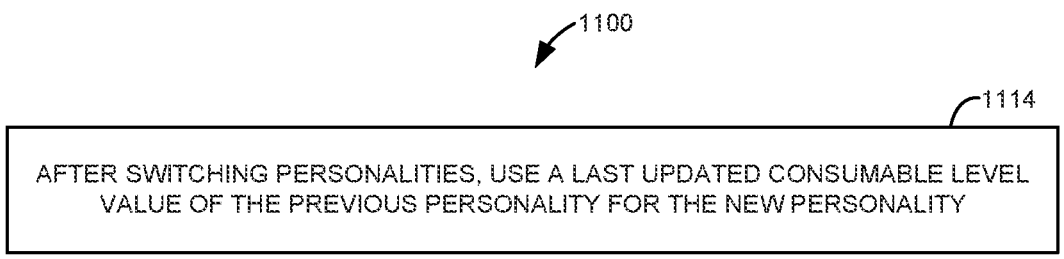
Figure 11D:
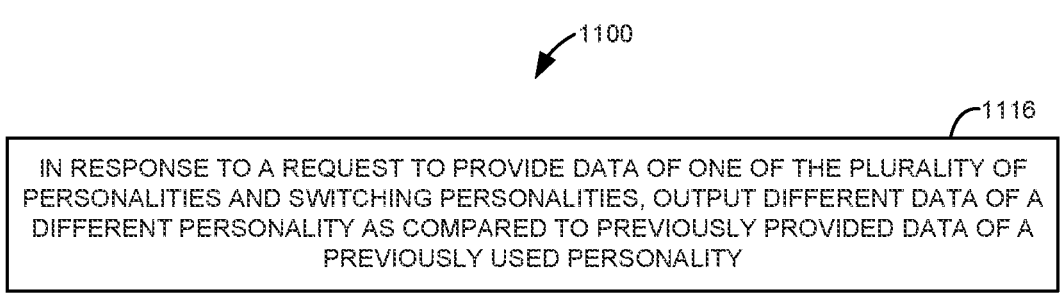

As illustrated in FIG. 11B at 1112, the logic circuit may be further configured to generate and/or update the plurality of personalities. As illustrated in FIG. 11C at 1114, the logic circuit may be further configured to after switching personalities, use a last updated consumable level value of the previous personality for the new personality. As illustrated in FIG. 11D at 1116, the logic circuit may be further configured to in response to a request to provide data of one of the plurality of personalities and switching personalities, output different data of a different personality as compared to previously provided data of a previously used personality.

Each of the logic circuitry packages 400a, 400b, and logic circuits 402a, 402b, 706 described herein may have any feature of any other logic circuitry packages 400a, 400b, or logic circuits 402a, 402b, 706 described herein. Any logic circuitry packages 400a, 400b, and/or logic circuits 402a, 402b, 706 may be configured to carry out at least one method block of the methods described herein.

In one aspect of this disclosure, a logic circuitry package for a replaceable print apparatus component comprises an interface to communicate with a print apparatus logic circuit, and a logic circuit. In certain examples, the logic circuit is configured to: include a plurality of personalities. Each personality of the plurality of personalities comprises at least one of an ID and a cryptographic key. The logic circuit may be configured to start a cryptographic session with the print apparatus logic circuit using a selected personality of the plurality of personalities, and, transmit a consumable level value to the print apparatus logic circuit in response to a request from the print apparatus logic circuit. The logic circuit may be configured to transmit the consumable level value independent of which personality of the plurality of personalities is the selected personality. For example, the consumable level value may correspond to a generally decreasing consumable level whereby the logic circuit may have switched personalities at least one time without resetting the consumable level to a full state. Rather, the consumable level indication of the logic circuit as transmitted over the various personalities corresponds to a generally decreasing consumable level.

In another aspect, the logic circuit may comprise a memory storing a plurality of personalities, each personality of the plurality of personalities comprising an ID, a cryptographic key, supply configuration data, and a consumable level value. The logic circuit may be configured to: start a cryptographic session with the print apparatus logic circuit using a selected personality of the plurality of personalities; receive, from the print apparatus logic circuit a write command to update the consumable level value of the selected personality; and in response to the write command, update the consumable level value of each personality of the plurality of personalities. In one example, for the different personalities, one shared consumable level memory field may be used or each personality may use its corresponding consumable level memory field. In both examples, the to be transmitted consumable level data for the different personalities will correspond to a generally decreasing consumable level.

In another aspect, a logic circuitry package and/or replaceable print apparatus cartridge comprises: a logic circuit and a logic circuit interface to communicate with a host print apparatus logic circuit. The cartridge may comprise a reservoir containing consumable material or a wearable consumable such as an organic photoconductor roller or fuser. The cartridge may comprise a consumable material output to dispense the consumable material. In one example, a logic circuit of the package and/or cartridge is configured to: output data of a first personality of a plurality of personalities, each personality of the plurality of personalities associated with a different ID and a different cryptographic key. The logic circuit may be configured to, in response to determining that the host print apparatus logic circuit does not accept the first personality, switch to another personality of the plurality of personalities to output data corresponding to the other personality of the plurality of personalities. Such data may comprise supply configuration data. The logic circuit may be configured to, in response to a first consumable level read command, output a first consumable level value representing a first consumable level; and, after dispensing a portion of the consumable material, in response to a consumable level update command of the host print apparatus logic circuit, update the first consumable level value to a second consumable level value to represent a decremented consumable level. For example, this represents the printer updating the consumable level value in a consumable level field after a print job. The logic circuit may be configured to, after switching to another personality and in response to a second consumable level read command, output the second consumable level value or another consumable level value corresponding to a consumable level decremented with respect to the first consumable level, so that, as the consumable level value is updated while consumable material is dispensed from the reservoir for multiple subsequent print jobs the consumable level value corresponds to a decreasing consumable level. For example, when the logic circuit switches personality without having printed the same last updated consumable level value of the previous personality may be used, or, a slightly different consumable level value may be used for the new personality that has some marginal difference with the previous last updated consumable level value but that still indicates a generally decreasing consumable level over the lifetime of the consumable in the cartridge.

The logic circuit of any one or combination of aspects and/or examples of this disclosure may comprise a memory to store the plurality of personalities. The logic circuit of any one or combination of aspects and/or examples of this disclosure may be configured to generate and/or update the plurality of personalities. The logic circuit of any one or combination of aspects and/or examples of this disclosure may be configured to facilitate updating the same consumable level value field in response to a further request from the print apparatus logic circuit independent of which personality of the plurality of personalities is the selected personality.

The logic circuit of any one or combination of aspects and/or examples of this disclosure may be configured to: upon powerup of the logic circuitry package, receive, from the print apparatus logic circuit, a query ID command; in response to the query ID command, transmit, to the print apparatus logic circuit, an ID corresponding to one personality of the plurality of personalities; and, in response to receiving a start session command from the print apparatus logic circuit, setting the one personality as the selected personality and starting the cryptographic session with the print apparatus logic circuit using the selected personality. The logic circuit of any one or combination of aspects and/or examples of this disclosure may be configured to: upon a subsequent powerup of the logic circuitry package, receive, from the print apparatus logic circuit, a further query ID command; and, in response to the further query ID command, transmit, to the print apparatus logic circuit, the ID corresponding to the selected personality. The logic circuit of any one or combination of aspects and/or examples of this disclosure may be configured to: upon powerup of the logic circuitry package, receive, from the print apparatus logic circuit, a query ID command; in response to the query ID command, transmit, to the print apparatus logic circuit, an ID corresponding to one personality of the plurality of personalities; and, in response to not receiving a start session command from the print apparatus logic circuit, setting the one personality as a failed personality such that upon a subsequent powerup of the logic circuitry package and upon receiving a further query ID command from the print apparatus logic circuit, the logic circuit transmits an ID corresponding to another personality of the plurality of personalities different from the failed personality to the print apparatus logic circuit.

The logic circuit of any one or combination of aspects and/or examples of this disclosure may be configured to: receive, from the print apparatus logic circuit, a start session command in response to the selected personality being accepted by the print apparatus logic circuit; and, transmit, to the print apparatus logic circuit, a session key ID to start the cryptographic session with the print apparatus logic circuit using the selected personality. The logic circuit of any one or combination of aspects and/or examples of this disclosure may be configured to: receive, from the print apparatus logic circuit, a plurality of read commands; and, transmit, to the print apparatus logic circuit, data corresponding to each of the plurality of read commands. The logic circuit of any one or combination of aspects and/or examples of this disclosure may be configured to: receive, from the print apparatus logic circuit, a plurality of integrity test commands; and, transmit, to the print apparatus logic circuit, a response corresponding to each of the plurality of integrity test commands. The logic circuit of any one or combination of aspects and/or examples of this disclosure may be configured to: receive, from the print apparatus logic circuit, a plurality of challenge commands; and, transmit, to the print apparatus logic circuit, a response corresponding to each of the plurality of challenge commands. The logic circuit of any one or combination of aspects and/or examples of this disclosure may be configured to: receive, from the print apparatus logic circuit, a plurality of write commands and data corresponding to each of the plurality of write commands; and, transmit, to the print apparatus logic circuit, a status corresponding to each of the plurality of write commands.

Each personality of the plurality of personalities of any of the mentioned aspects or examples may comprise supply configuration data. Supply configuration data of any of the previous examples and/or aspects may comprise a consumable fill level, a color, an intended region of use, and a supply identity. For the different aspects and/or examples, a portion of the configuration data may be shared amongst the plurality of personalities and/or another portion of the configuration data may be different between different personalities of the plurality of personalities. The consumable of any of the mentioned aspects and/or examples consumable may comprise ink, dry toner, liquid toner, or a 3D print agent. A replaceable print apparatus cartridge may comprise a reservoir to hold consumable material; an output to dispense the consumable material; and, the logic circuitry package and/or logic circuit of any of the aspects and/or examples of this disclosure. In certain examples and/or aspects of this disclosure, the ID and cryptographic key may be different for different personalities of the plurality of personalities, and the consumable level value and at least a portion of the configuration data may be shared amongst the different personalities. In some of the examples and/or aspects of this disclosure, the logic circuit may be configured to: receive, from the print apparatus logic circuit, a read command to read the consumable level value of the selected personality; and, in response to the read command, transmit, to the print apparatus logic circuit, the consumable level value of the selected personality. In certain examples and/or aspects of this disclosure, the logic circuit may be configured to, after switching personalities, use a last updated consumable level value of the previous personality for the new personality. In certain examples and/or aspects of this disclosure, the logic circuit may comprise at least one memory field comprising the consumable level value, the at least one memory field having an address, so that consumable level read or write commands may be directed to the address, wherein: outputting the consumable level value in response to the first consumable level read command comprises facilitating a read of a value stored in the addressed at least one memory field; and, outputting the second consumable level value after switching to the other personality, in response to the second consumable level read command, comprises facilitating a read of a second value stored in the addressed at least one memory field as last updated by the host print apparatus logic circuit; or, outputting the other consumable level value after switching to the other personality, in response to the second consumable level read command, comprises facilitating a read of another value similar to a value last updated by the host print apparatus logic circuit from the addressed at least one memory field. While for certain examples the same consumable level data field may be used amongst different personalities, it is not excluded in this disclosure to generate slightly different values or source from a different memory field for transmitting the generally decreasing consumable level value over the different personalities that may be used over the lifetime of the consumable. In certain examples and/or aspects of this disclosure, the access mode of the at least one memory field is set to facilitate updating the value stored in the at least one memory field in one count direction only, to represent a generally decrementing consumable level as consumable material is consumed.

In certain examples and/or aspects of this disclosure, determining that the host print apparatus logic circuit does not accept one of the plurality of personalities comprises at least one of: detecting exceeding of a time period between an authentication response to the host print apparatus logic circuit and a subsequent command to the logic circuit; and, a host print apparatus logic circuit power cycle. In certain examples and/or aspects of this disclosure, the logic circuit is configured to, in response to a request to provide data of one of the plurality of personalities and switching personalities, output different data of a different personality as compared to previously provided data of a previously used personality. In certain examples and/or aspects of this disclosure, a logic circuit of a consumable component's logic circuitry package is configured to, when it detects that a print apparatus logic circuit does not authenticate all or a portion of its personalities, set the to-be-read consumable level value to correspond to an exhausted consumable level (e.g., a consumable level memory field may be set to all zeros or all ones). In certain examples and/or aspects of this disclosure, the logic circuit may be configured to, in addition to or instead of setting its to-be-read consumable level value to an empty state, switch to a personality pre-associated with an empty consumable level value. Any selection of the above features may be combined with any selection of other features.

Examples in the present disclosure can be provided as methods, systems or machine readable instructions, such as any combination of software, hardware, firmware or the like. Such machine readable instructions may be included on a machine readable storage medium (including but not limited to EEPROM, PROM, flash memory, disc storage, CD-ROM, optical storage, etc.) having machine readable program codes therein or thereon.

The present disclosure is described with reference to flow charts and block diagrams of the method, devices, and systems according to examples of the present disclosure. Although the flow diagrams described above show a specific order of execution, the order of execution may differ from that which is depicted. Blocks described in relation to one flow chart may be combined with those of another flow chart. It shall be understood that at least some blocks in the flow charts and block diagrams, as well as combinations thereof can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus, functional modules of the apparatus and devices (for example, logic circuitry and/or controllers) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array, etc. The methods and functional modules may all be performed by a single processor or divided amongst several processors.

Such machine readable instructions may also be stored in a machine readable storage (e.g., a tangible machine readable medium) that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

The word "comprising" does not exclude the presence of elements other than those listed in a claim, and "a" or "an" does not exclude a plurality.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A replaceable print apparatus cartridge comprising:
a logic circuit and a logic circuit interface to communicate with a host;
a reservoir containing consumable material; and
a consumable material output to dispense the consumable material,
wherein the logic circuit comprises
a plurality of personalities, each personality of the plurality of personalities associated with a different ID and a different cryptographic key;

common configuration data wherein the plurality of personalities are associated with the same common configuration data;

wherein the logic circuit is configured to:
output data of a first personality of a plurality of personalities; and
in response to determining that the host print apparatus logic circuit does not accept the first personality, switch to another personality of the plurality of personalities to output data corresponding to the other personality of the plurality of personalities.

2. The replaceable print apparatus cartridge of claim 1, wherein the logic circuit is configured to generate and/or update the plurality of personalities,
in response to a first consumable level read command, output a first consumable level value representing a first consumable level; and, after dispensing a portion of the consumable material,
in response to a consumable level update command of the host print apparatus logic circuit, update the first consumable level value to a second consumable level value to represent a decremented consumable level; and
after switching to another personality and in response to a second consumable level read command, output the second consumable level value or another consumable level value corresponding to a consumable level decremented with respect to the first consumable level, so that, as the consumable level value is updated while consumable material is dispensed from the reservoir for multiple subsequent print jobs the consumable level value corresponds to a decreasing consumable level.

3. The replaceable print apparatus cartridge of claim 1, wherein the logic circuit is configured to, after switching personalities, use a last updated consumable level value of the previous personality for the new personality.

4. The replaceable print apparatus cartridge of claim 1, wherein the logic circuit comprises at least one memory field comprising the consumable level value, the at least one memory field having an address, so that consumable level read or write commands may be directed to the address, wherein:
outputting the consumable level value in response to the first consumable level read command comprises facilitating a read of a value stored in the addressed at least one memory field; and
outputting the second consumable level value after switching to the other personality, in response to the second consumable level read command, comprises facilitating a read of a second value stored in the addressed at least one memory field as last updated by the host print apparatus logic circuit; or
outputting the other consumable level value after switching to the other personality, in response to the second consumable level read command, comprises facilitating a read of another value similar to a value last updated by the host print apparatus logic circuit from the addressed at least one memory field.

5. The replaceable print apparatus cartridge of claim 4, wherein the access mode of the at least one memory field is set to facilitate updating the value stored in the at least one memory field in one count direction only, to represent a generally decrementing consumable level as consumable material is consumed.

6. The replaceable print apparatus cartridge of claim 1, wherein determining that the host print apparatus logic circuit does not accept one of the plurality of personalities comprises at least one of:
detecting exceeding of a time period between an authentication response to the host print apparatus logic circuit and a subsequent command to the logic circuit; and
a host print apparatus logic circuit power cycle.

7. The replaceable print apparatus cartridge of claim 1, wherein the logic circuit is configured to, in response to a request to provide data of one of the plurality of personalities and switching personalities, output different data of a different personality as compared to previously provided data of a previously used personality.

8. The replaceable print apparatus cartridge of claim 1, wherein the logic circuit is configured to transmit a consumable level value to the host logic circuit in response to a request from the host logic circuit independent of which personality of the plurality of personalities is the selected personality.

9. The replaceable print apparatus cartridge of claim 1, wherein the logic circuit is configured to:
upon powerup of the logic circuitry package, receive, from the host logic circuit, a query ID command;
in response to the query ID command, transmit, to the host logic circuit, an ID corresponding to one personality of the plurality of personalities; and
in response to receiving a start session command from the host logic circuit, setting the one personality as the selected personality and starting the cryptographic session with the host logic circuit using the selected personality.

10. The replaceable print apparatus cartridge of claim 1, wherein the logic circuit is configured to:
upon a subsequent powerup of the logic circuitry package, receive, from the host logic circuit, a further query ID command; and
in response to the further query ID command, transmit, to the host logic circuit, the ID corresponding to the selected personality.

11. The replaceable print apparatus cartridge of claim 1, wherein the logic circuit is configured to:
receive, from the host logic circuit, a start session command in response to the selected personality being accepted by the host logic circuit; and
transmit, to the host logic circuit, a session key ID to start the cryptographic session with the host logic circuit using the selected personality.

12. A logic circuitry package for a replaceable print apparatus component comprising an interface to communicate with a host logic circuit, and
a logic circuit configured to:
include a plurality of personalities, each personality of the plurality of personalities comprising an ID and a cryptographic key;
start a cryptographic session with the host logic circuit using a selected personality of the plurality of personalities;
transmit a consumable level value to the host logic circuit in response to a request from the host logic circuit independent of which personality of the plurality of personalities is the selected personality;
receive, from the host logic circuit, a query ID command upon powerup of the logic circuitry package;

transmit, to the host logic circuit, an ID corresponding to one personality of the plurality of personalities in response to the query ID command; and set the one personality as the selected personality in response to receiving a start session command from the host logic circuit and start the cryptographic session with the host logic circuit using the selected personality.

13. The logic circuitry package of claim 12, further comprising a memory to store the plurality of personalities.

14. The logic circuitry package of claim 12, wherein the logic circuit is configured to:

upon a subsequent powerup of the logic circuitry package, receive, from the host logic circuit, a further query ID command; and in response to the further query ID command, transmit, to the host logic circuit, the ID corresponding to the selected personality.

15. The logic circuitry package of claim 12, wherein the logic circuit is configured to:

receive, from the host logic circuit, a start session command in response to the selected personality being accepted by the host logic circuit; and transmit, to the host logic circuit, a session key ID to start the cryptographic session with the host logic circuit using the selected personality.

16. The logic circuitry package of claim 12, wherein the logic circuit is configured to:

receive, from the host logic circuit, a plurality of read commands; and transmit, to the host logic circuit, data corresponding to each of the plurality of read commands.

17. The logic circuitry package of claim 12, wherein the logic circuit is configured to:

receive, from the host logic circuit, a plurality of integrity test commands; and transmit, to the host logic circuit, a response corresponding to each of the plurality of integrity test commands.

18. The logic circuitry package of claim 12, wherein the logic circuit is configured to:

receive, from the host logic circuit, a plurality of challenge commands; and transmit, to the host logic circuit, a response corresponding to each of the plurality of challenge commands.

19. The logic circuitry package of claim 12, wherein the logic circuit is configured to:

receive, from the host logic circuit, a plurality of write commands and data corresponding to each of the plurality of write commands; and transmit, to the host logic circuit, a status corresponding to each of the plurality of write commands.

20. The logic circuitry package of claim 12, further comprising supply configuration data for each personality of the plurality of personalities.

21. The logic circuitry package of claim 20, wherein the supply configuration data comprises a consumable fill level, a color, an intended region of use, and a supply identity.

22. The logic circuit package of claim 20, wherein at least a portion of the supply configuration data is shared amongst the plurality of personalities.

23. The logic circuitry package of claim 20, wherein the ID and cryptographic key are different for different personalities of the plurality of personalities.

24. The logic circuitry package of claim 20, wherein the logic circuit is configured to:

receive, from the host logic circuit, a read command to read the consumable level value of the selected personality; and in response to the read command, transmit, to the host logic circuit, the consumable level value of the selected personality.

25. The logic circuitry package of any of claim 12, wherein the consumable comprises ink, dry toner, liquid toner, or a 3D print agent.

* * * * *